(12) United States Patent
Nair et al.

(10) Patent No.: US 7,739,938 B2
(45) Date of Patent: Jun. 22, 2010

(54) GAS GENERATOR LAUNCHER FOR SMALL UNMANNED AERIAL VEHICLES (UAVS)

(75) Inventors: Michael L. Nair, Rosedale, MD (US); John A. Condon, Timonium, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 331 days.

(21) Appl. No.: 11/856,037

(22) Filed: Sep. 15, 2007

(65) Prior Publication Data

US 2010/0123041 A1    May 20, 2010

Related U.S. Application Data

(60) Provisional application No. 60/846,592, filed on Sep. 22, 2006.

(51) Int. Cl.
  *F41A 1/04*  (2006.01)
(52) U.S. Cl. .............................. 89/7; 102/522
(58) Field of Classification Search .......... 89/7; 102/522, 523
  See application file for complete search history.

(56) References Cited

U.S. PATENT DOCUMENTS 429,592 A * 6/1890 Babcock ........................ 89/7
3,981,093 A  9/1976 Reed
4,930,242 A  6/1990 Bialy
4,944,210 A  7/1990 Flock et al.
5,381,722 A * 1/1995 Begneu ......................... 89/7
6,164,179 A  12/2000 Buffman
6,418,870 B1  7/2002 Lanowy et al.
6,688,032 B1  2/2004 Gonzalez et al.

FOREIGN PATENT DOCUMENTS

WO   WO/2006/091240 A2   8/2006

* cited by examiner

*Primary Examiner*—Stephen M Johnson
(74) *Attorney, Agent, or Firm*—William V. Adams; Christos S. Kyriakou

(57) ABSTRACT

The launching of an unmanned projectile includes pre-packaging a barrel with a projectile, a pusher cup, and a gas generator. The gas generator generates gas to propel the projectile out of the barrel. A pressure chamber increases a pressure of the gas in the barrel. The pressure chamber comprises a front body portion connected to the gas generator; an aft body portion connected to the front body portion and the gas generator; and a vent sleeve positioned around the front body portion and adapted to provide an aperture through which the gas exits the barrel in order to control a level of gas pressure in the barrel. A triggering of the gas generator causes the pusher cup to push the projectile out of the barrel at a predetermined launch velocity in order to attain a predetermined self-propelled flight trajectory, wherein the triggering causes the pusher cup to exit the barrel.

12 Claims, 11 Drawing Sheets

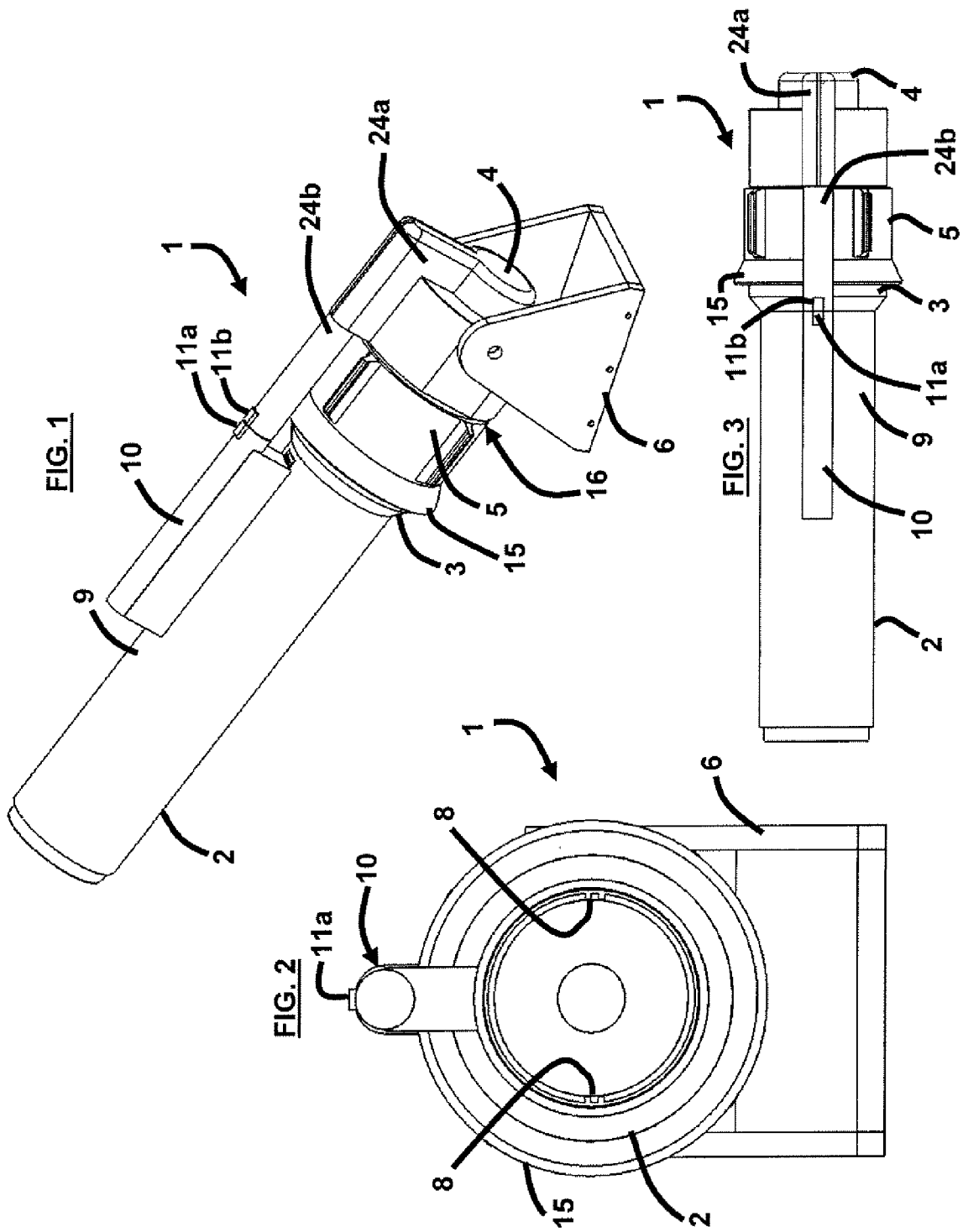

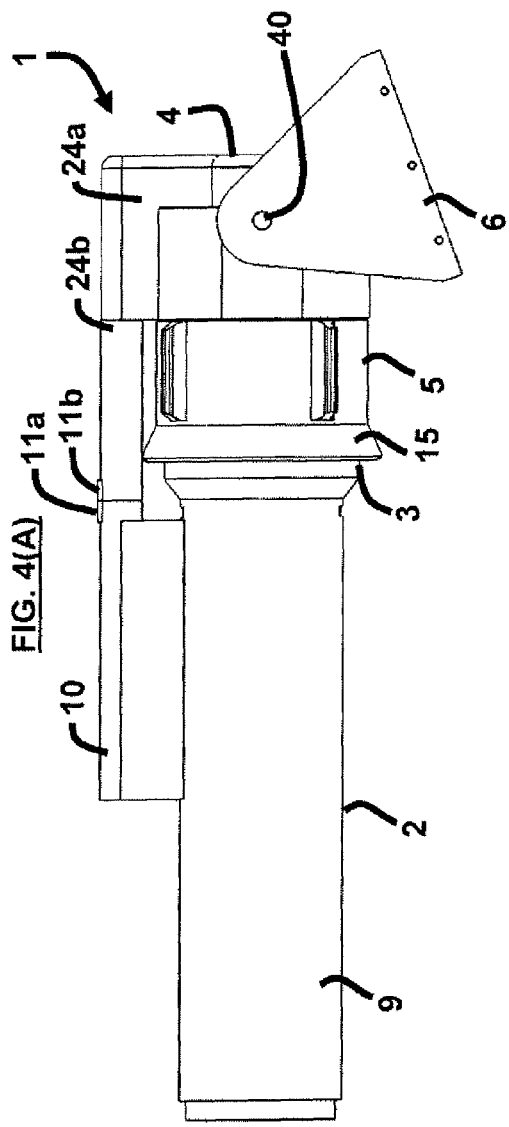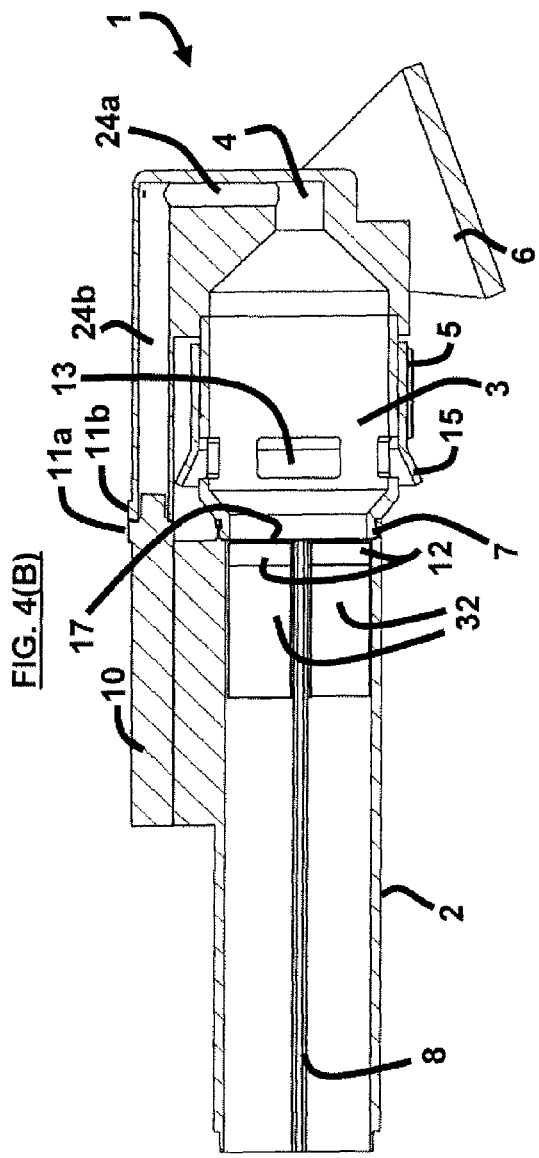

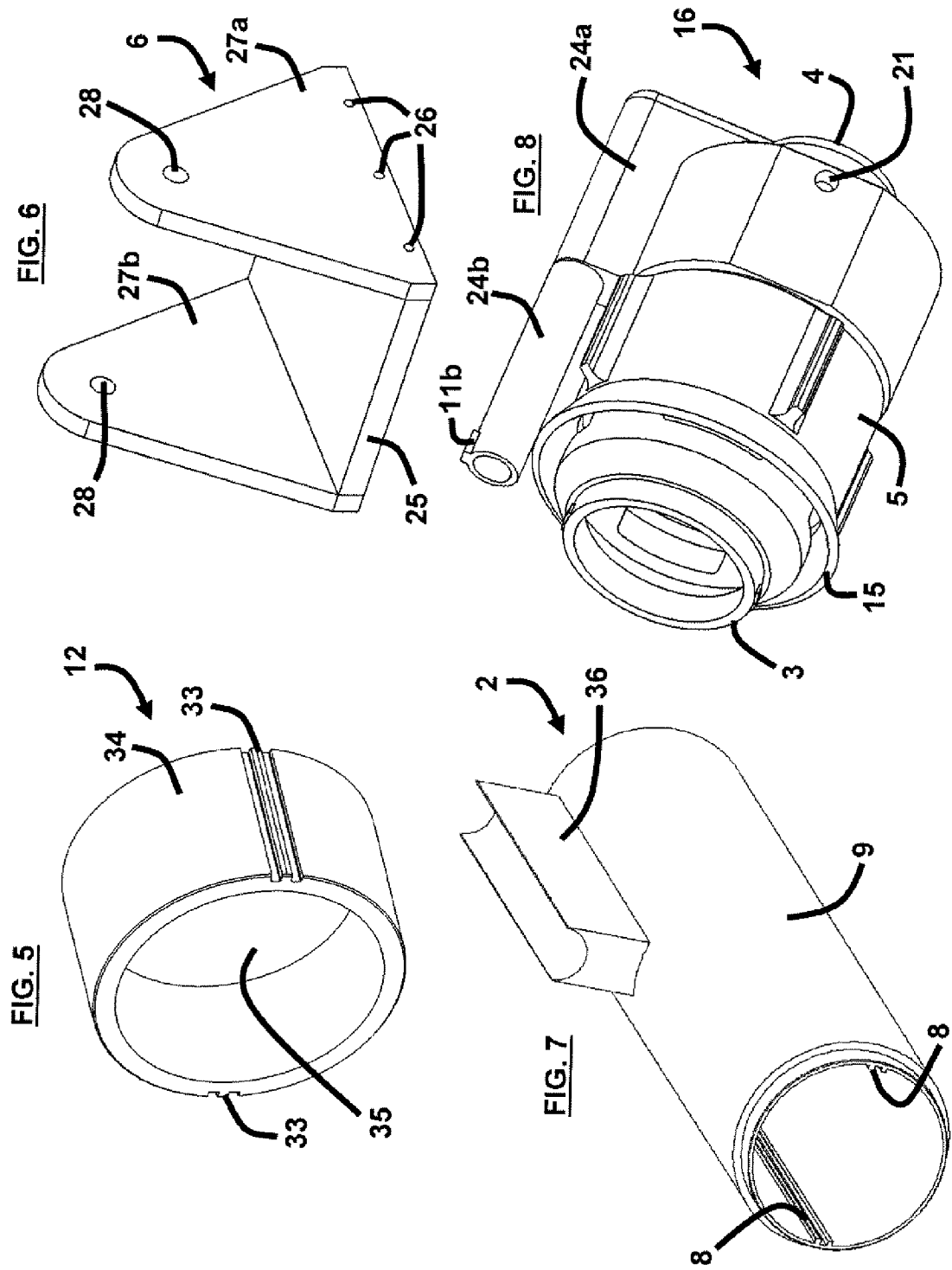

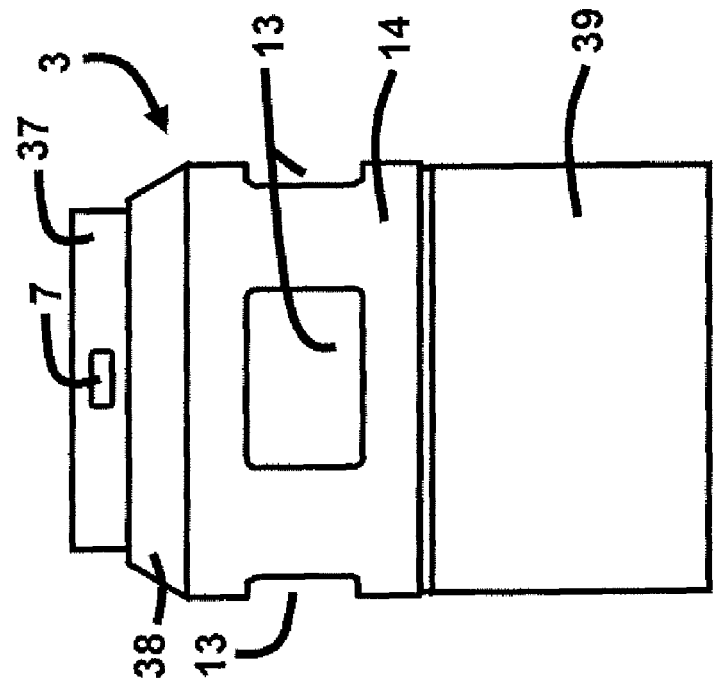
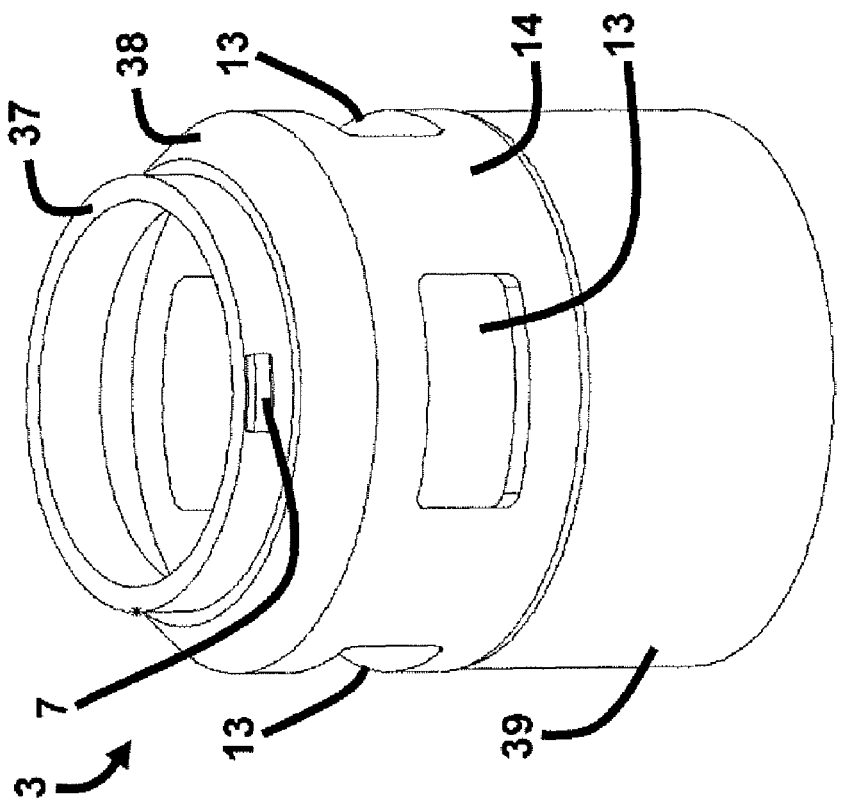

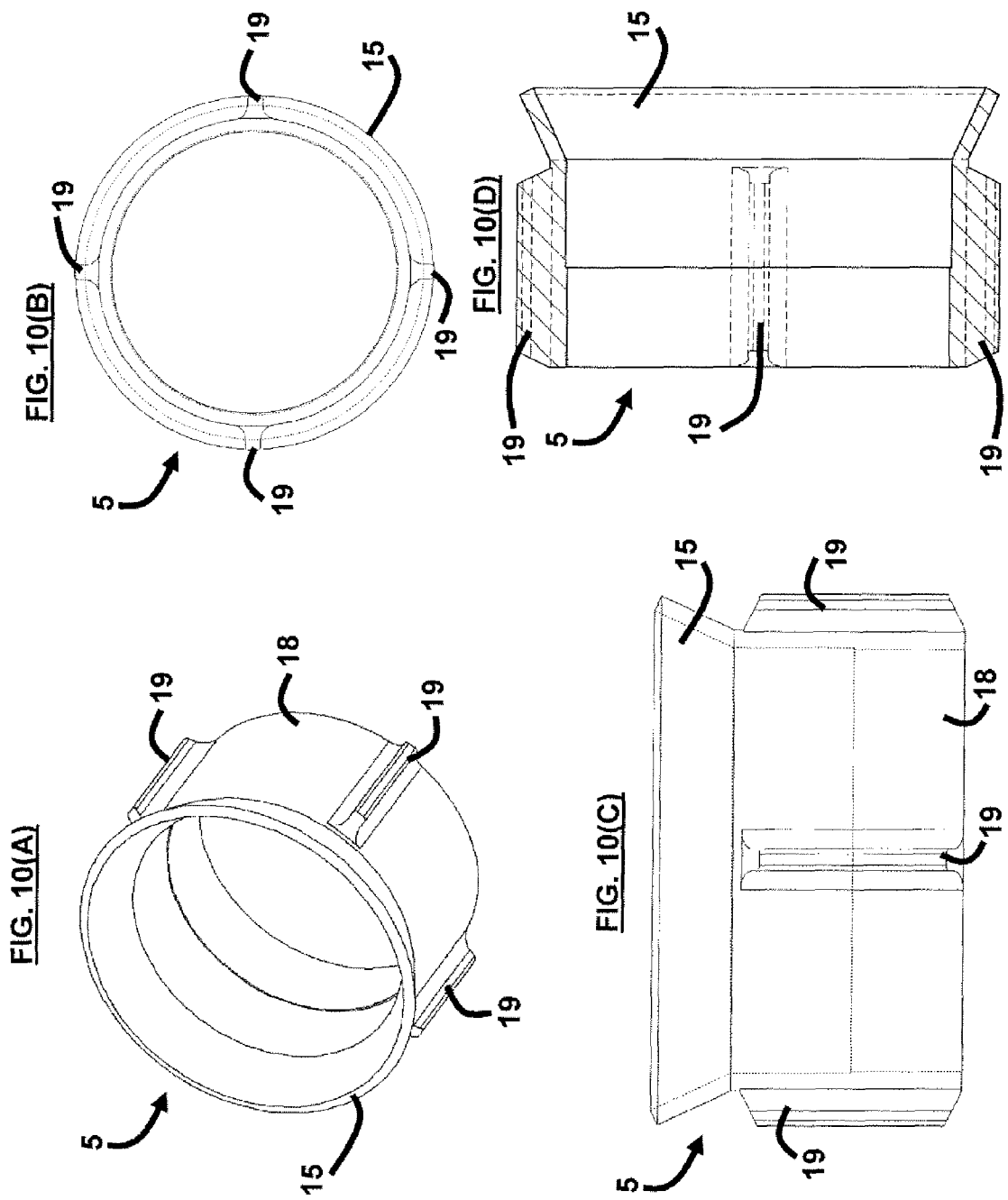

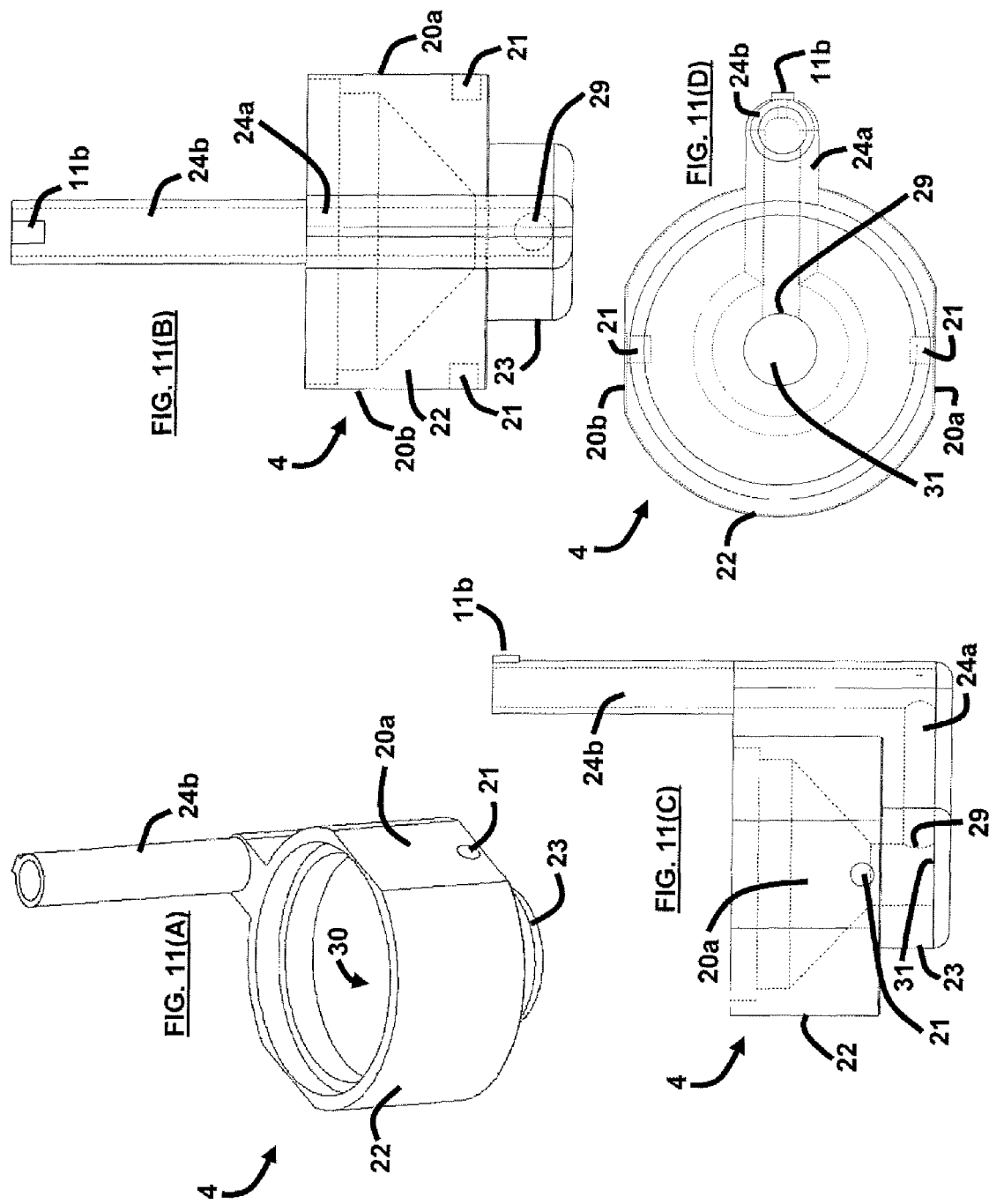

Velocity of UAV

Position of UAV

Velocity of UAV

Position of UAV

GAS GENERATOR LAUNCHER FOR SMALL UNMANNED AERIAL VEHICLES (UAVS)

CROSS REFERENCE TO RELATED APPLICATION

This application claims the benefit of U.S. Provisional Patent Application No. 60/846,592 and entitled "Gas Generator Launcher for Small Unmanned Aerial Vehicles (UAVs)," filed on Sep. 22, 2006, the complete disclosure of which in its entirety is herein incorporated by reference.

GOVERNMENT INTEREST

The embodiments described herein may be manufactured, used, and/or licensed by or for the United States Government without the payments of royalties thereon.

BACKGROUND

1. Technical Field

The embodiments herein generally relate to weapon deployment systems, and, more particularly, to weapon deployment systems used for small unmanned aerial vehicles (UAVs).

2. Description of the Related Art

UAVs are typically used in military operations such as for surveillance. Typical launchers used for UAVs are generally large, cumbersome, or costly to use, and sometimes require multiple people to operate, require special handling for proper deployment, and often require hand assembly of the UAV. Conventional launchers for launching small "fixed-wing" UAVs in the military include hydraulic/electric rail guns, elastic band type launchers, pneumatic launchers, and hand launchers. However, there remains a need for a novel weapons launcher for small UAVs capable of being used by one person in a rapid, simple, and cost effective manner.

SUMMARY

In view of the foregoing, an embodiment herein provides a system for launching an unmanned projectile, wherein the system comprises a barrel comprising the projectile, a pusher cup positioned behind the projectile, guide rails adapted to prevent the projectile from rotating in the barrel, and a gas generator adapted to generate gas to propel the projectile out of the barrel. The system further comprises a pressure chamber operatively connected to the barrel, wherein the barrel extends out of a first end of the pressure chamber, wherein the pressure chamber is adapted to increase a pressure of the gas in the barrel, and wherein the pressure chamber comprises a front body portion operatively connected to the barrel; an aft body portion operatively connected to the front body portion and the gas generator; and a vent sleeve positioned around the front body portion and adapted to provide an aperture through which the gas exits the barrel in order to control a level of gas pressure in the barrel. The system further comprises a stand operatively connected to the aft body portion, wherein the stand is rotatable with respect to the barrel, wherein a triggering of the gas generator causes the pusher cup to push the projectile out of the barrel at a predetermined launch velocity in order to attain a predetermined self-propelled flight trajectory, and wherein the triggering causes the pusher cup to exit the barrel.

Preferably, the gas generator utilizes approximately 24Vdc of external electrical power to initiate functioning of the gas generator. Moreover, the pressure chamber may comprise a plurality of interconnected sections adapted to vent propulsion gases created by the gas generator upon launch of the projectile. Additionally, the barrel, the projectile, the gas generator, and the pusher cup are preferably expendable after each launch of the projectile. Furthermore, the vent sleeve may comprise a gas deflector adapted to redirect the vented propulsion gases forward and away from a user standing behind the barrel. Also, the pusher cup preferably has a higher aerodynamic drag and lower inertia than the projectile, wherein as the projectile and the pusher cup exit the barrel, the higher aerodynamic drag and lower inertia of the pusher cup causes a rapid deceleration and separation of the pusher cup from the projectile, thereby allowing the projectile to continue a ballistic flight path prior to transition to a self-propelled flight.

Another embodiment provides a method of launching unmanned projectiles, wherein the method comprises inserting a projectile into a barrel comprising a pusher cup positioned behind the projectile; attaching a gas generator to the barrel; connecting the gas generator and the barrel to a pressure chamber; initiating the gas generator to generate gas; pressurizing the gas; introducing the pressurized gas into the barrel; selectively venting the pressurized gas out of the barrel to control a level of gas pressure in the barrel; and the pressurized gas exerting force on the pusher cup causing the pusher cup to push the projectile out of the barrel at a predetermined launch velocity in order to attain a predetermined self-propelled flight trajectory, wherein the force causes the pusher cup to exit the barrel.

Preferably, the increase in the pressure creates a dynamic force applied to an upstream side of the pusher cup causing acceleration of the pusher cup and the projectile. Additionally, the pusher cup preferably has a higher aerodynamic drag and lower inertia than the projectile, wherein as the projectile and the pusher cup exit the barrel, the higher aerodynamic drag and lower inertia of the pusher cup causes a rapid deceleration and separation of the pusher cup from the projectile, thereby allowing the projectile to continue a ballistic flight path prior to transition to a self-propelled flight. Also, the method may further comprise redirecting the vented gas forward and away from a user standing behind the barrel. Moreover, the inserting and attaching processes may occur in a pre-packaging of the barrel to include the projectile, the pusher cup, and the gas generator. Additionally, prior to the initiating process, the method may further comprise attaching the pressure chamber to a launcher mount assembly, wherein the pressure chamber is adapted to pressurize the gas, wherein the connecting process creates sufficient electrical and mechanical connections to allow the projectile to be prepared for launch.

Preferably, the pre-packaging of the barrel to include the projectile, the pusher cup, and the gas generator allows for a repeatable launch operation comprising launching the projectile; and replacing of a spent barrel with a new pre-packaged barrel comprising a new projectile, a new pusher cup, and a new gas generator. Preferably, the gas generator utilizes approximately 24Vdc of external electrical power to initiate functioning of the gas generator.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a schematic diagram illustrating a perspective view of a gas generator launcher according to an embodiment herein;

FIG. 2 is a schematic diagram illustrating a front view of the gas generator launcher of FIG. 1 according to an embodiment herein;

FIG. 3 is a schematic diagram illustrating a top view of the gas generator launcher of FIG. 1 according to an embodiment herein;

FIG. 4(A) is a schematic diagram illustrating a side view of the gas generator launcher of FIG. 1 according to an embodiment herein;

FIG. 4(B) is a schematic diagram illustrating a cross-sectional view of the gas generator launcher of FIG. 4(A) according to an embodiment herein;

FIG. 5 is a schematic diagram illustrating a perspective view of the pusher cup of the gas generator launcher of FIG. 4(B) according to an embodiment herein;

FIG. 6 is a schematic diagram illustrating a perspective view of the launcher mount of the gas generator launcher of FIG. 1 according to an embodiment herein;

FIG. 7 is a schematic diagram illustrating a perspective view of the barrel of the gas generator launcher of FIG. 1 according to an embodiment herein;

FIG. 8 is a schematic diagram illustrating a perspective view of the pressure chamber of the gas generator launcher of FIG. 1 according to an embodiment herein;

FIG. 9(A) is a schematic diagram illustrating a perspective view of the front body of the pressure chamber of FIG. 8 according to an embodiment herein;

FIG. 9(B) is a schematic diagram illustrating a side view of the front body of FIG. 9(A) according to an embodiment herein;

FIG. 10(A) is a schematic diagram illustrating a perspective view of the vent sleeve of the pressure chamber of FIG. 8 according to an embodiment herein;

FIG. 10(B) is a schematic diagram illustrating a top view of the vent sleeve of FIG. 10(A) according to an embodiment herein;

FIG. 10(C) is a schematic diagram illustrating a side view of the vent sleeve of FIG. 10(A) according to an embodiment herein;

FIG. 10(D) is a schematic diagram illustrating a cross-sectional side view of the vent sleeve of FIG. 10(A) according to an embodiment herein;

FIG. 11(A) is a schematic diagram illustrating a perspective view of the aft body of the pressure chamber of FIG. 8 according to an embodiment herein;

FIGS. 11(B) and 11(C) are schematic diagrams illustrating side views of the aft body of FIG. 11(A) according to an embodiment herein;

FIG. 11(D) is a schematic diagram illustrating a top view of the aft body of FIG. 11(A) according to an embodiment herein;

DETAILED DESCRIPTION OF PREFERRED EMBODIMENTS

Figure 12:
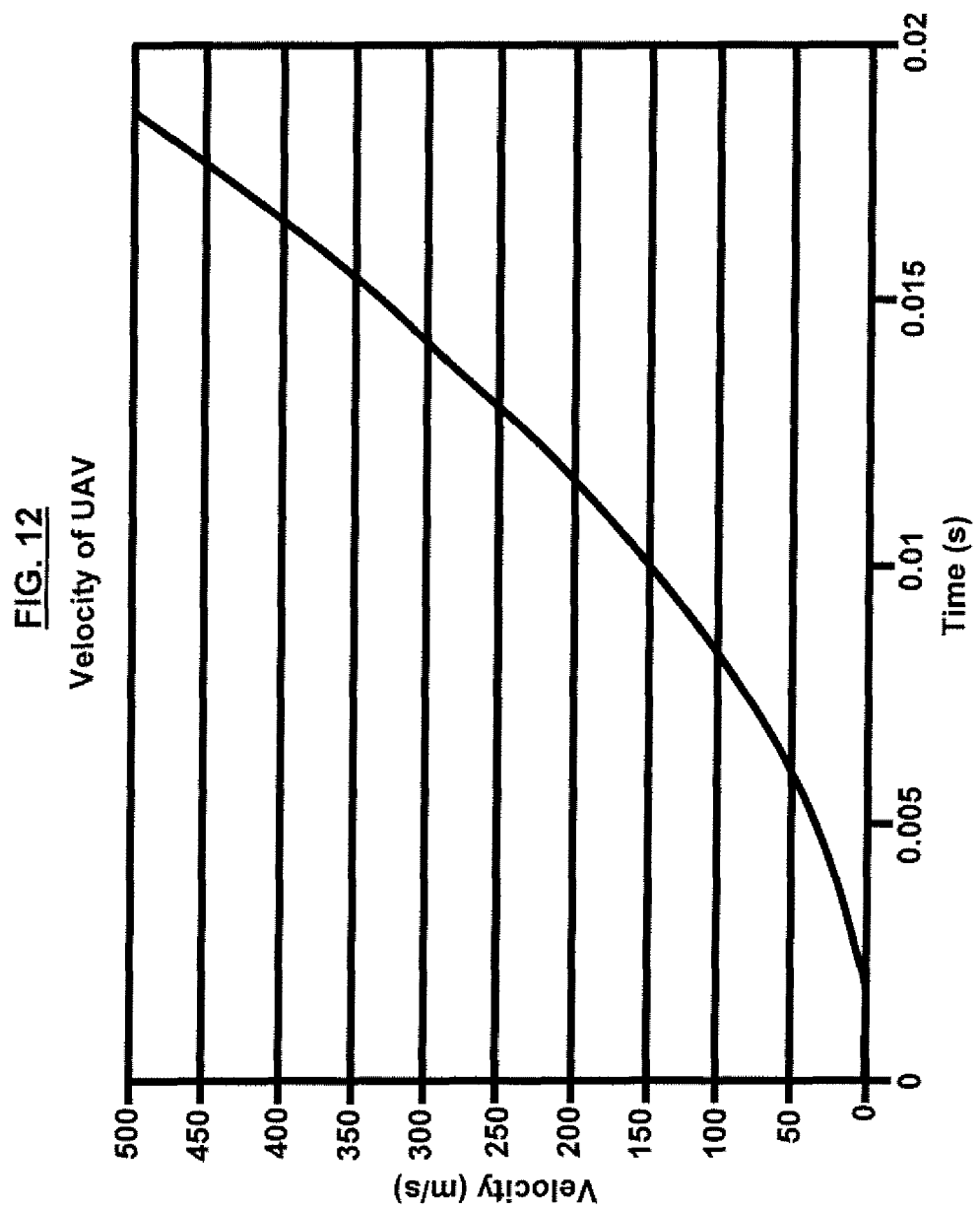
FIGS. 12 and 14 are graphical representations illustrating the velocity of the UAV as a function of time according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a novel weapons launcher for small UAVs capable of being used by one person in a rapid, simple, and cost effective manner. The embodiments herein achieve this by providing a compact, easy-to-use, and cost-effective gas generator launcher for small UAVs that uses a common initiation source, variable venting, re-direction of propulsion gases, and uses a short disposable barrel with an attached gas generator, which houses and environmentally protects an internally preloaded UAV and pusher cup. The small gas generator is used to accelerate the UAV to flight speed as it travels down the barrel that also acts as a storage and shipping container for the UAV itself. Referring now to the drawings, and more particularly to FIGS. 1 through 16, where similar reference characters denote corresponding features consistently throughout the figures, there are shown preferred embodiments.

FIGS. 1 through 4(B), illustrate a gas generator launcher 1 according to an embodiment herein. Generally, the launcher 1 comprises a barrel 2, a launcher mount 6, and a pressure chamber 16. Preferably, the barrel 2 comprises a single-section, lightweight, high-strength composite or plastic material and may further include a plurality of interconnected sections to accommodate a higher launch velocity. The barrel 2 is affixed to the pressure chamber 16, which comprises a front body portion 3, an aft body portion 4, a vent sleeve 5, and a first and second portion of a pressure conduit 24a, 24b. The total length of these three parts is approximately nine inches with a maximum diameter of approximately six inches. A gas generator 10 is operatively connected to the barrel 2, wherein the gas generator 10 is connected to the pressure chamber 16 via the first portion of the pressure conduit 24a and the second portion of the pressure conduit 24b to allow for the unimpeded flow of gas in the gas generator 10.

The barrel 2 is affixed to the front body portion 3 of the pressure chamber 16, which may be made of aluminum, via a locking mechanism 7 (best shown in FIG. 4(B)) that allows for easy connection and removal of the barrel 2. Any suitable locking mechanism 7 may be used that facilitates a proper securing of the barrel 2 to the front body portion 3, and likewise, which can allow for easy removal of the barrel 2 from the front body portion 3. Along the interior length of the barrel 2 are a plurality of barrel rails 8 (for example, two barrel rails 8) that guide a UAV or other type of projectile 32 (shown, for example, as a cylindrical projectile 32 in FIG. 4(B)) that is loaded in the barrel 2 as it travels down the barrel 2 upon launch. Along the exterior barrel wall 9, the gas generator 10 is mounted on the grooved base 36 in such a position so that when the barrel 2 is attached to the front body portion 3 via the locking mechanism 7, the gas generator 10 also becomes properly connected to the launcher 1. An example of a gas generator 10 that may be used is the S-100 multipurpose inflator available from Talley Defense Systems, Arizona, USA. In one embodiment, the gas generator 10 is approximately eight inches long and has a one-inch diameter. Moreover, in one embodiment, the gas generator 10 may be powered by TAL-1309 propellant also available from Talley Defense Systems, which, upon ignition, produces no toxic or flammable products.

The gas generator 10 also incorporates an electrical interface 11a, which is adjacent to electrical interface 11b of the second portion of the pressure conduit 24b, which allows for the connection of electrical leads (not shown) as the barrel 2 is attached to the pressure chamber 16. The barrel 2 is expendable after use and thus contains its own gas generator 10 as well as a pre-loaded UAV 32 and pusher cup 12 allowing for easy shipping and transportation. To facilitate the propelling of the UAV 32 down the barrel 2, the pusher cup 12 is used. The pusher cup 12, which is further illustrated in FIG. 5, may be embodied as a lightweight piston that has an outer diameter slightly smaller than the inner diameter of the barrel 2 providing a low friction, pressure seal feature. As best shown in FIG. 4(B), the pusher cup 12 is placed behind the UAV 32 in the barrel 2 providing a uniform surface that the pressurized gases are acting upon ensuring a consistent and repeatable launch velocity. The barrel rails 8 guide the pusher cup 12 as the pusher cup 12 travels down the barrel 2. With reference to FIGS. 4(B) and 5, in order to facilitate proper seating in the barrel 2, the pusher cup 12 comprises rail slides 33 configured on opposite sides of the outer wall 34 of the pusher cup 12, which mate with the barrel rails 8 of the barrel 2 to allow the pusher cup 12 to slide in the barrel 2 without rotating. When seated in the barrel 2, a pushing wall 35 contacts the UAV 32 and after the pusher cup 12 pushes the UAV 32 out of the barrel 2, the pusher cup 12 simply falls away from the UAV 32 a short distance from the barrel 2 upon exit due to its higher drag.

The launcher 1 is operatively connected to the launcher mount 6, which allows for positioning of the launcher 1 at various angles. As illustrated in FIG. 6, the launcher mount 6 is generally composed of three pieces: a rectangular base 25 with multiple tapped holes 26 for connection to two triangular sides 27a, 27b. Moreover, each of the sides 27a, 27b comprise a hole 28. FIG. 7 illustrates the barrel 2 in more detail. As shown in FIG. 7, the barrel rails 8 are located on diametrically opposite sides of the inside of the barrel 2. Moreover, the grooved base 36 is shown extending outward from the exterior barrel wall 9 such that the shape of the grooved base 36 is configured to allow for proper seating of the gas generator 10 thereon.

As mentioned, the pressure chamber 16 comprises a front body portion 3, an aft body portion 4, and a vent sleeve 5. FIG. 8 illustrates a fully assembled pressure chamber 16 including the first portion of the pressure conduit 24a and second portion of the pressure conduit 24b. The front body portion 3, as depicted in FIGS. 9(A) and 9(B), is generally cylindrically shaped and has a plurality of large vent holes 13, which are cut into the middle wall 14 of the front body portion 3, and which are covered by the vent sleeve 5 (best shown in FIG. 4(B)). The front body portion 3 has a locking mechanism 7 configured in the lip 37 of the front body portion 3 to secure the barrel 2 to front body portion 3. An angled neck portion 38 connects the lip 37 to the middle wall 14 of the front body portion 3, which terminates with a generally cylindrical trunk 39. As shown in FIGS. 10(A) through 10(D), the vent sleeve 5 is generally cylindrically shaped and is hollow to fit over the front body portion 3. The vent sleeve 5 comprises a curved wall 18 with a gas deflector 15 attached so that when the vent holes 13 are opened, the vent sleeve 5 will direct the escaping gases towards the front body portion 3 of the launcher 1 rather than the aft body portion 4 so as to prevent any injuries to personnel located behind or to the side of the launcher 1. The vent sleeve 5, which may be composed of aluminum, and the front body portion 3 are both rotatable so that the position of the vent sleeve 5 with respect to the front body portion 3 can be varied to either open or close the vent holes 13 to allow different quantities of the generated gas to be released into the atmosphere. The vent holes 13 can be opened or closed by turning the handles 19 of the vent sleeve 5. When the vent holes 13 are sealed, the launcher 1 is in the maximum muzzle velocity condition. By increasing the amount of venting, the exit velocity of the UAV 32 can be reduced.

Next, FIGS. 11(A) through 11(D) illustrate the aft body portion 4 of the pressure chamber 16 (of FIG. 8). The aft body portion 4 is also generally cylindrically shaped with an attached first portion of the pressure conduit 24a and second portion of the pressure conduit 24b. The aft body portion 4 comprises an enlarged first portion 22 comprising flat surfaces 20a, 20b each comprising a hole 21 to align with hole 28 of the launcher mount 6 (of FIG. 6) for attachment thereto via attachment means 40 (shown in FIG. 4(A)), which may comprise screws, bolts, rivets, pins, etc. The holes 21, 28 with the attachment means 40 allow for the pressure chamber 16 to be rotatable with respect to the launcher mount 6. The aft body portion 4 comprises an open end 30 that terminates to a base 31 that connects to the hole 29. Moreover, the aft body portion 4 further includes a smaller second portion 23 that provides for the attachment of the first portion of the pressure conduit 24a to the open end 30 via hole 29.

With respect to FIGS. 1 through 11(D), to assemble the launcher 1, the barrel 2 is attached (i.e., screwed, etc.) to the front body portion 3. Again, the barrel 2 is pre-packaged with a UAV 32, pusher cup 12, and gas generator 10 attached. In this step, the gas generator 10 is aligned with the second portion of the pressure conduit 24b of the pressure chamber 16. Preferably, the gas generator 10 comprises electrical interface 11a and the second portion of the pressure conduit 24b comprises electrical interface 11b such that when the gas generator 10 and second portion of the pressure conduit 24b are aligned with one another, the electrical interfaces 11a, 11b also become aligned with respect to one another. The vent sleeve 5 is attached (i.e., screwed, etc.) onto the front body portion 3 from the rear. The aft body portion 4 is then attached (i.e., screwed, etc.) onto the front body portion 3. The two mount sides 27a, 27b are attached (i.e., screwed, etc.) to the base 25. Then, the aft body portion 4 is attached (i.e., screwed, etc.) to the mount sides 27a, 27b and then the barrel 2 is positioned at the desired angle. The electrical interface 11a is included with the gas generator 10 and terminates with wire leads (not shown). After the initial assembly, to repeat the launch operation, only the barrel 2 (with the attached gas generator 10) of the launcher 1 would need to be removed and replaced with a new barrel 2 (with the pre-packaged UAV 32, pusher cup 12, and gas generator 10).

Thereafter, the launcher 1 is ready to be fired. To fire the launcher 1, an external electrical signal is sent to the gas generator 10 via electrical interface 11a, 11b beginning the pyrotechnic event and causing an almost instantaneous increase in pressure in the front body portion 3 of the pressure (expansion) chamber 16. As the pressure builds, a dynamic force is applied to the upstream side 17 of the pusher cup 12 and both the pusher cup 12 and UAV 32 begin accelerating down the barrel 2. As the UAV 32 and pusher cup 12 exit the barrel 2, the higher aerodynamic drag of the pusher cup 12 causes its rapid deceleration and separation from the UAV 32 allowing the UAV 32 to continue its ballistic flight path prior to its transition to self-propelled flight. After launching the UAV 32, the launcher 1 is ready to fire another UAV 32 simply by replacing the barrel 2 (with the preloaded UAV 32 and pusher cup 12 contained therein and the gas generator 10 affixed to the exterior of the barrel 2). The barrel 2 is preferably disposable and, depending on the situation, can either be discarded or used again by preparing the used barrel 2 with a new gas generator 10, pusher cup 12, and UAV 32.

The calculations below provide the validity that the gas generator 10 has the capacity to accelerate the UAV 32 to required velocities. For the purpose of this analysis, it is assumed that the gas generator 10 is a Talley S-100 multipurpose inflator and that the UAV 32 is a folding wing design requiring a launch velocity of 30 m/s to transition to flight. Two separate approaches to this problem are described. The first uses the ideal gas law:

$$PV = nRT \quad (1)$$

in which:

P=pressure

V=volume n=number of moles

R=gas constant

T=temperature

This approach assumes that the temperature remains constant during the pyrotechnic event and further discounts the expansion of the volume as the pusher cup 12 moves along the barrel 2. As the gas cools (temperature decreases), the pressure also decreases according to Equation (1). For example, TAL-1309 propellant tends to demonstrate a slow decline in pressure after approximately 0.018 seconds. The TAL-1309 propellant has a flame temperature of 1,274° C. which implies that the gas generated is quite hot. Although the gas generator 10 does have heat sinks, the gas exiting the gas generator 10 will still be at an elevated temperature. Since the time scale of the ignition is much shorter than the time it takes for the gas to cool, it is reasonable to assume that the gas is at a constant temperature from the time it is generated to the time it fills the pressure chamber 16.

Again, using the material properties of TAL-1309 as an example, PV=5,094 Pa-m³ at t=0.018 s. The amount of volume available in the pressure chamber 16 when the UAV 32 and pusher cup 12 are in their starting position is approximately 0.004 m³ and the area of the pusher cup 12 upon which the pressure is applied is 7.85×10⁻³ m². A fourth order approximation of the pressure curve can be generated with an $R^2$ value of 0.9815:

$$P = -1 \times 10^{11} t^4 + 2 \times 10^{10} t^3 - 1 \times 10^9 t^2 + 3 \times 10^7 t - 16985 \quad (2)$$

in which P is pressure in Pascals and t is time in seconds. However, Equation (2) represents the pressure curve given a 1-ft³ volume (0.0283 m³). The relationship:

$$P_1 V_1 = P_2 V_2 \quad (3)$$

shows that to accurately scale the pressure, a factor of $$\frac{V_1}{V_2}$$

must be applied to Equation (2) to represent the pressure in the pressure chamber 16. Given the basic equation for linear velocity:

$$v = at \quad (4)$$

in which v is velocity and a is a constant acceleration, the exit velocity of the UAV 32 can be correlated to the gas pressure by the following relations:

$$a = \frac{F}{m} \quad (5)$$

in which F is a constant force and m is the mass of the UAV 32 and pusher cup 12 that is assumed to be 1 kilogram for these calculations. Dimensional analysis indicates that:

$$F = PA \quad (6)$$

in which A is the area upon which the pressure is applied. By substitution of Equations (4), (5), and (6), the following can be derived:

$$v = \frac{A}{m} Pt. \quad (7)$$

By the derivative relationship between acceleration and velocity, Equation (6) can be rewritten as:

$$v = \int \frac{A}{m} P \, dt. \quad (8)$$

Substituting Equation (2) and the pressure scaling factor yields:

$$v = \int \frac{A V_1}{m V_2} (-1 \times 10^{11} t^4 + 2 \times 10^{10} t^3 - 1 \times 10^9 t^2 + 3 \times 10^7 t - 16985) \, dt. \quad (9)$$

Equation (9) indicates that the exit velocity of the UAV 32 will depend entirely upon the time that it is in the barrel 2.

The relationship between velocity and position can be used to determine the position of the UAV 32 at $t_{final}$.

$$s = \int v \, dt \quad (10)$$

in which s is the position.

Figure 13:
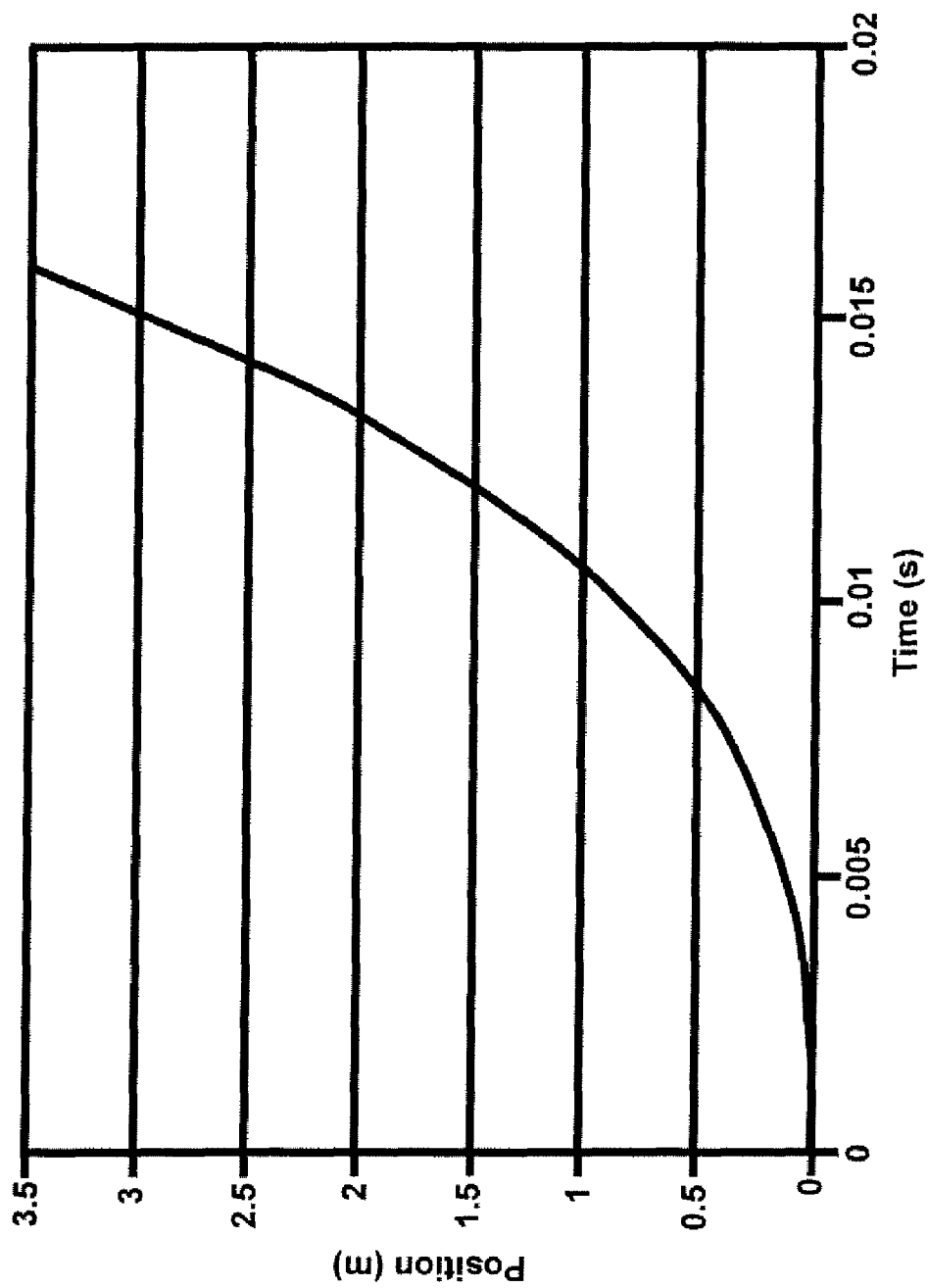
FIGS. 13 and 15 are graphical representations illustrating the position of the UAV as a function of time according to the embodiments herein.

FIGS. 12 and 13 show the velocity and position of the UAV 32 as a function of time, respectively using the above equations. Given the length of the barrel 2 (approximately 15.5 inches (0.39 m)), the time it takes for the UAV 32 to exit the launcher 1 is approximately 0.008 seconds. According to FIG. 13, the velocity of the UAV 32, at 0.008 seconds, is approximately 115 m/s, which is significantly higher than the required velocity for flight of the UAV 32. Based on this analysis, the required launch velocity can be achieved if the vent sleeve 5 is opened to reduce the pressure applied to the pusher cup 12 if the pressure is assumed to be constant as the UAV 32 travels down the barrel 2.

The second analysis aims to provide better estimate of the effects of the expanding control volume. Given the results of the previous analysis, it appears likely that the launch event will take approximately 0.008 seconds. There is a short time delay from the initiation of the launch event until the gas generator 10 starts building pressure. In a launcher application, this time lag would be ignored since the analysis only begins at the initiation of the pressure buildup. Therefore, a linear approximation of the pressure curve is created that runs from time t=0.002 seconds until t=0.017. This approximation is calculated to be:

$$P = 1.314 \times 10^7 t + 2.857 \times 10^3. \tag{11}$$

With this approximation and the previously calculated launch time, the average pressure of the gas generator 10 in the 1-ft³ control volume from t=0 to t=0.008 seconds is 53,986 Pa. Given the average pressure and volume of the pressure chamber 16, $P_1 V_1 = 53,986$ Pa $\times 0.0283$ m³ = 1,527.9 Nm. The control volume of the launcher 1 at t=0 is the volume of the pressure chamber 16, which is approximately 0.0016 m³. By Equation (10), the pressure, $P_2$, is 954.9 kPa. At the moment when the UAV 32 is exiting the barrel 2, the control volume is 0.0016 m³ plus the volume of the barrel 2, 0.0025 m³. At that time, the pressure in the barrel 2, $P_3$, is 363.8 kPa. If it is assumed that the increase in volume is linear, the average value of the pressure is equal to:

$$P_{AVG} = \frac{P_2 + P_3}{2} \tag{12}$$

which is calculated to be 659.4 kPa. Equation (4) shows that the average pressure can be related to the average force, and the average force is calculated to be 5,175.9 N. The equation for position can be written in the standard linear form as:

$$s = \frac{1}{2} a t^2. \tag{13}$$

Substituting Equation (5) leads to the equation:

$$s = \frac{1}{2} \frac{F}{m} t^2. \tag{14}$$

The time at which the UAV 32 leaves the barrel 2 at 0.39 m is then:

$$t = \sqrt{\frac{2ms}{F}} \tag{15}$$

which is calculated to be 0.0117 seconds. Given the disagreement between the assumed time duration of the launch, 0.008 seconds, and the calculated value, several iterations are performed. After several iterations, the assumed time duration of the launch is 0.010392 and the calculated value is 0.010278 which leaves an error of less than 2%. The exit velocity can be calculated with Equation (4) and is found to be 75.89 m/s.

This analysis is similarly straightforward, but based on the calculations, the launch velocity is again significantly higher than that required by the UAV 32 for flight.

Both analyses indicate that the gas generator 10 is capable of providing the needed pressure for achieving launch velocity. However, if it is determined that the gas generator 10 is not producing the required pressure, the length of the barrel 2 can be altered by the addition of another 15.5-inch section to the barrel 2. This would increase the launch velocity by increasing the time that the pressure is applied to the pusher cup 12.

For Talley S-100 multipurpose inflators with the optional slow burn rate, the first analysis can be recalculated with a sixth order polynomial for the pressure curve approximation. The pressure curve approximation is:

$$P = -6.144 \times 10^6 t^6 + 2.212 \times 10^7 t^5 - 3.172 \times 10^7 t^4 + 2.307 \times 10^7 t^3 - 8.909 \times 10^6 t^2 + 1.682 \times 10^6 t + 1310. \tag{16}$$

Figure 14:
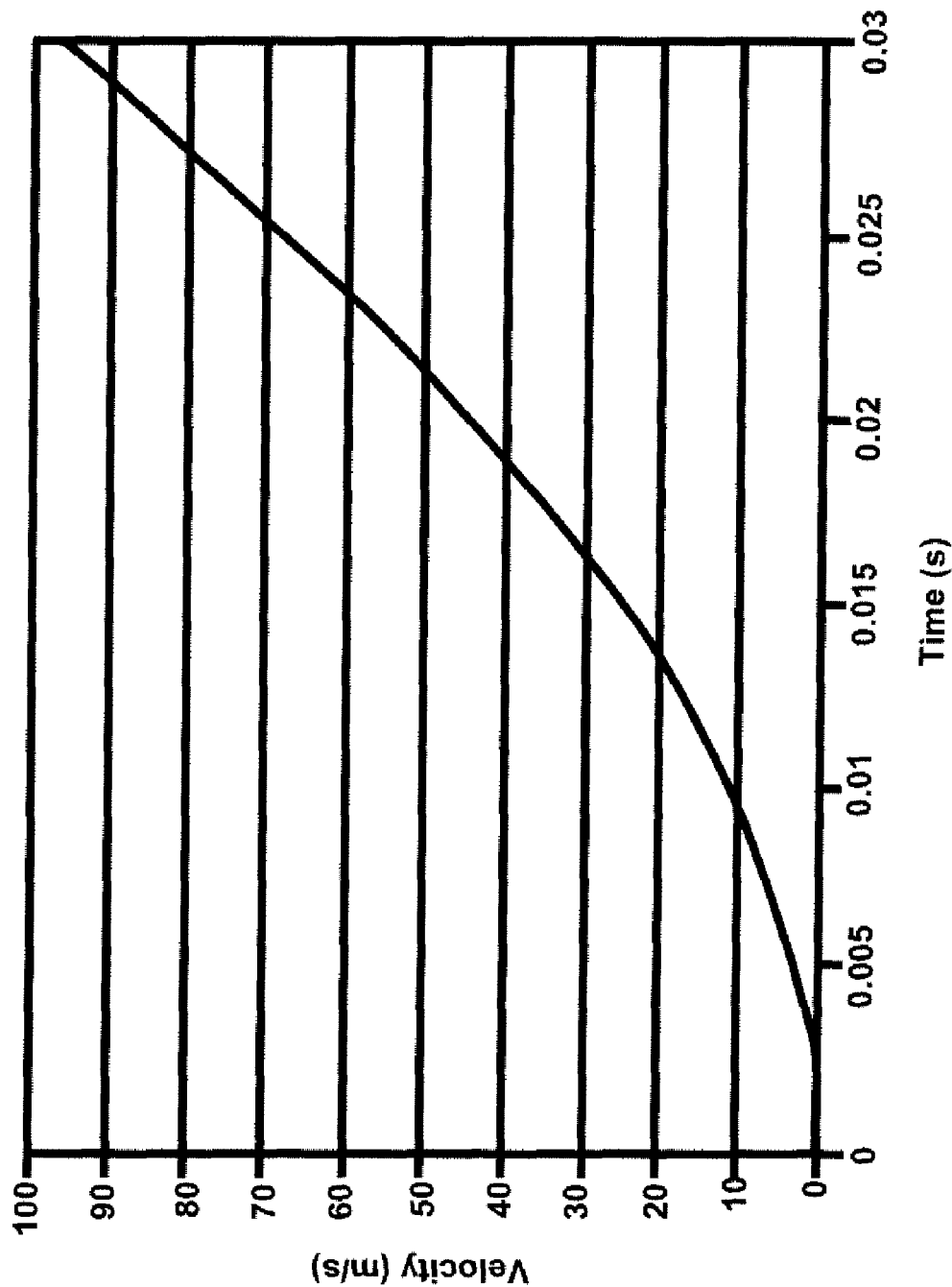
Figure 15:
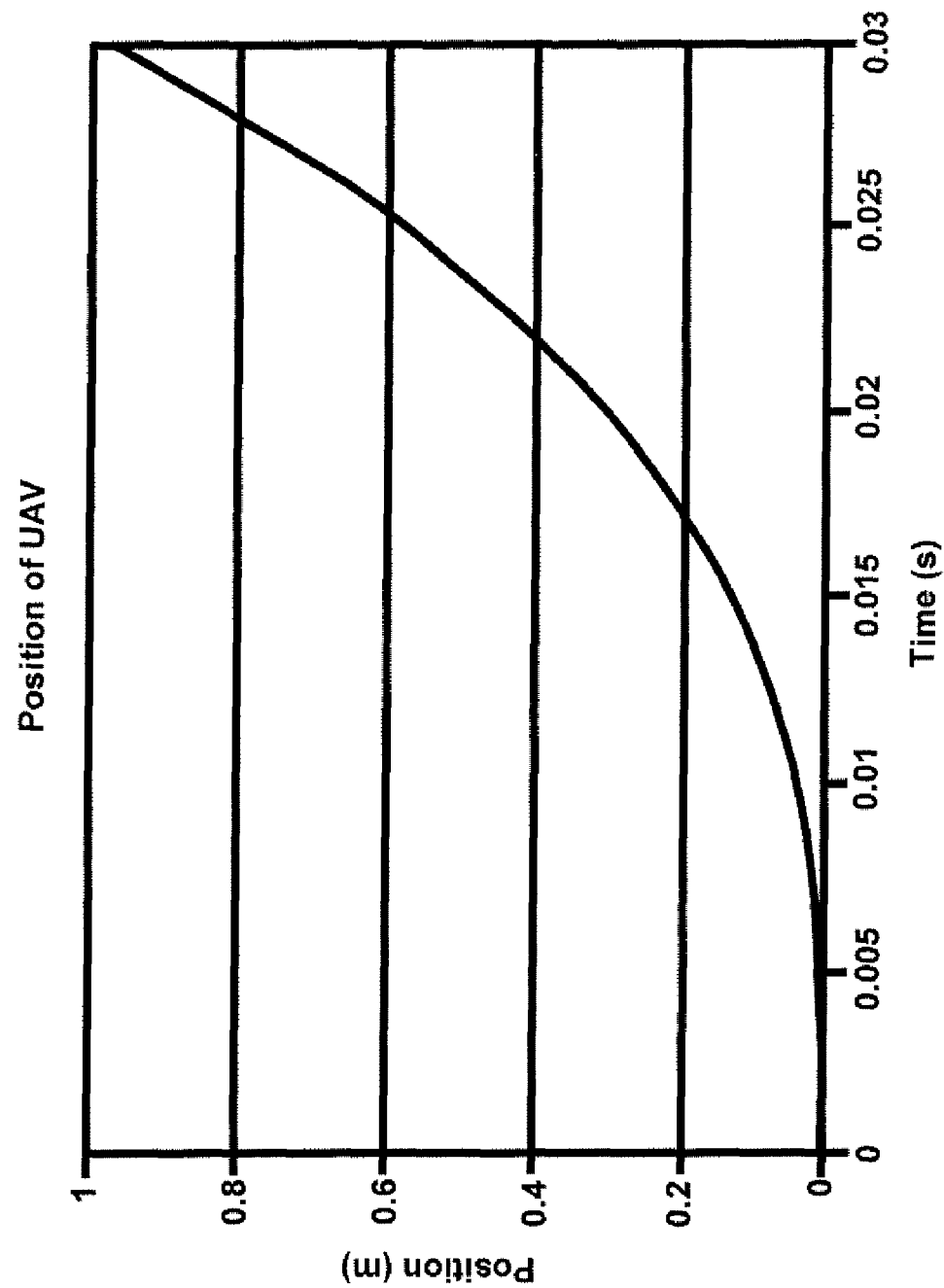

The velocity can be calculated by the substitution of Equation (15) into Equation (8). The position s can be calculated by the integration of the obtained velocity equation. The velocity and position are shown in FIGS. 14 and 15, respectively.

These calculations indicate that the UAV 32 will be traveling at approximately 50 m/s minimum when it exits the barrel 2 at 0.39 m with the slower burn gas generators 10. With the second approach, when the average pressure in the pressure chamber 16 is found, the predicted linear approximation of the pressure is given by:

$$P = 1.2781 \times 10^6 t + 4.6713 \times 10^3. \tag{17}$$

After iteration, the launch duration is assumed to be 0.021415 seconds and the calculated value is 0.021438 seconds. The predicted launch velocity given this time duration is 36.38 m/s.

The structural analysis of the aft body portion 4 predicts that the maximum stress during launch would be 36.7 MPa around the hole 21 for the bolt that carries the main load of the launcher 1. This maximum Von Mises stress occurs at 0.018 seconds from ignition of the gas generator 10. Similar analysis of the vent sleeve 5 and the front body portion 3 is also conducted with the same parameters listed previously. The maximum stress in the vent sleeve 5 is calculated to be 49.4 MPa and also occurs at 0.018 seconds. These analyses demonstrate that the physical design of the launcher 1 is sufficiently robust to withstand the launch pressures caused by the gas generator 10 when constructed of structural grade aluminum.

The use of a gas generator 10 allows for a compact launcher 1 without the need for compressors or compressed gas canisters. The only external input required for such a launcher 1 would be electrical power to initiate the gas generator 10. Such a system allows for the launcher 1 to sit in a state of readiness for long periods of time without the need for maintenance, and it could be fired at a moment's notice from the cabin of a ground vehicle (not shown).

Figure 16:
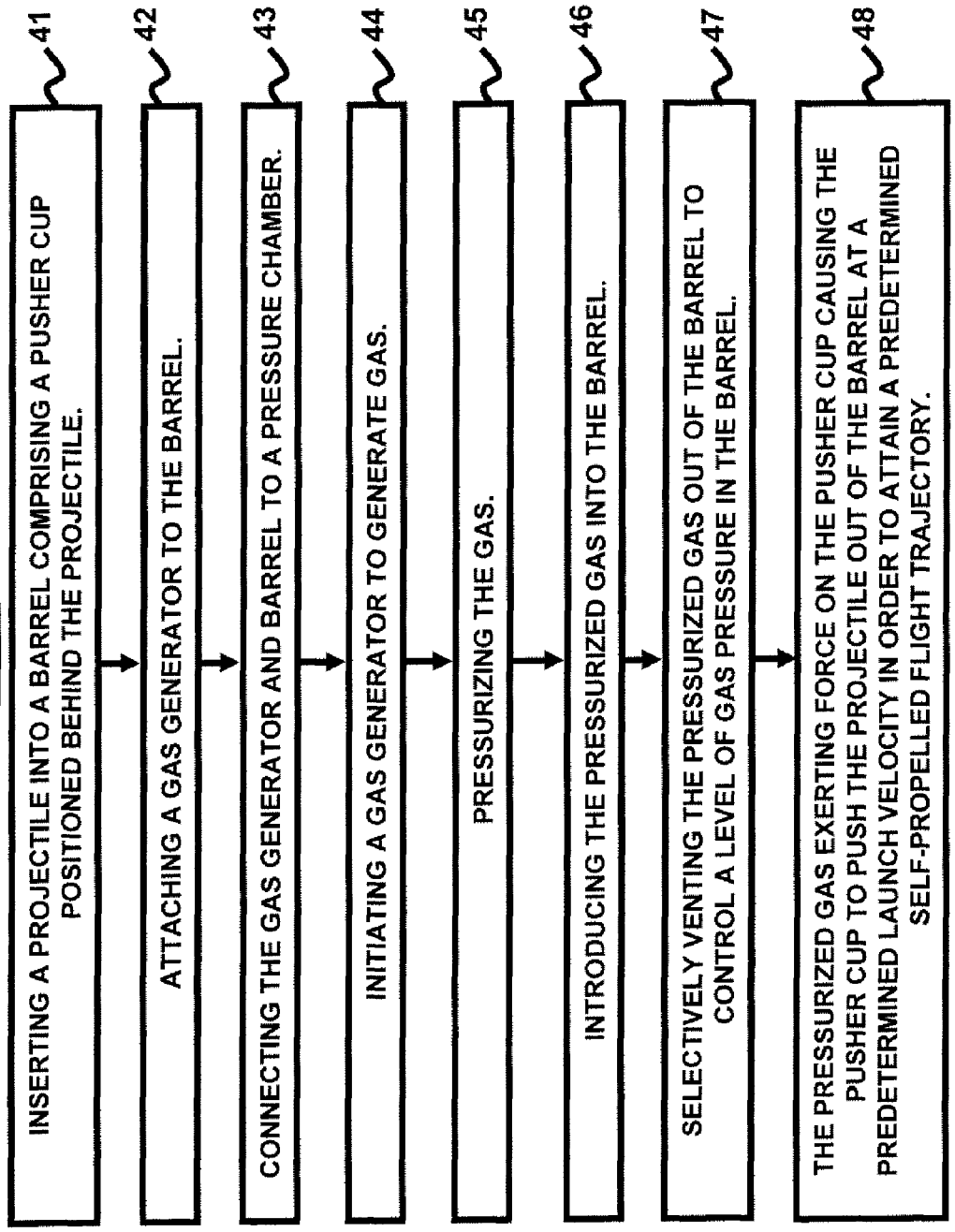
FIG. 16 is a flow diagram illustrating a preferred method of launching an unmanned projectile according to an embodiment herein.

FIG. 16, with reference to FIGS. 1 through 15, is a flow diagram illustrating a method of launching unmanned projectiles 32 according to an embodiment herein, wherein the method comprises inserting (41) a projectile 32 into a barrel 2 comprising a pusher cup 12 positioned behind the projectile 32; attaching (42) a gas generator 10 to the barrel 2; connecting (43) the gas generator 10 and the barrel 2 to a pressure chamber 16; initiating (44) the gas generator 10 to generate gas; pressurizing (45) the gas; introducing (46) the pressurized gas into the barrel 2; selectively venting (47) the pressurized gas out of the barrel 2 to control a level of gas pressure in the barrel 2; and the pressurized gas exerting (48) force on the pusher cup 12 causing the pusher cup 12 to push the projectile 32 out of the barrel 2 at a predetermined launch velocity in order to attain a predetermined self-propelled flight trajectory, wherein the force causes the pusher cup 12 to exit the barrel 2. Preferably, the increase in the pressure creates a dynamic force applied to an upstream side of the pusher cup 12 causing acceleration of the pusher cup 12 and the projectile 32. Moreover, the pusher cup 12 preferably has a higher aerodynamic drag and lower inertia than the projectile 32, wherein as the projectile 32 and the pusher cup 12 exit the barrel 2, the higher aerodynamic drag and lower inertia of the pusher cup 12 causes a rapid deceleration and separation of the pusher cup 12 from the projectile 32, thereby allowing the projectile 32 to continue a ballistic flight path prior to transition to a self-propelled flight.

Additionally, the method may further comprise redirecting the vented gas forward and away from a user standing behind the barrel 2, wherein the redirection of the vented gas extends to a cone angle of approximately 25 degrees from a geometric longitudinal centerline of the barrel 2 outward. Preferably, the inserting (41) and attaching (42) processes occur in a pre-packaging of the barrel 2 to include the projectile 32, the pusher cup 12, and the gas generator 10, wherein prior to the initiating (44) process, the method may further comprise attaching the pressure chamber 16, which is adapted to pressurize the gas, to a launcher mount assembly 6, wherein the connecting process (43) creates sufficient electrical and mechanical connections to allow the projectile 32 to be prepared for launch. Furthermore, the pre-packaging of the barrel 2 to include the projectile 32, the pusher cup 12, and the gas generator 10 allows for a repeatable launch operation comprising launching the projectile 32 and replacing of a spent barrel 2 with a new pre-packaged barrel 2 comprising a new projectile 32, a new pusher cup 12, and a new gas generator 10. Preferably, the gas generator 10 utilizes approximately 24Vdc of external electrical power to initiate functioning of the gas generator 10.

The launcher 1 is compact in size and utilizes a common initiation source (i.e., approximately 24Vdc). Moreover, the launcher 1 allows for simple, manually/hand-actuated, variable venting and re-directing of propulsion gases prior to launch varying muzzle velocity and setback axial acceleration depending on the physical characteristics or properties of the projectile 32. The benefit of re-directing the propulsion gases is that it helps prevent injuries to operators located directly behind or to the side of the launcher 1. Moreover, using a gas generator 10 eliminates the need for extraneous pressure source components such as a separate gas reservoir and gas compressor/tank, thereby resulting in a much smaller footprint than conventional launchers and enabling deployment of UAVs 32 with little preparation time.

Additionally, the launcher 1 provides an improved alternative to the overall unattractive, relatively large footprint/volume/mass properties of most other conventional launchers. In addition, the use of a commercially available gas generator 10 provides for a unique instantaneous source of propulsion gas for launching small UAVs 32 at relatively low setback accelerations and at relatively high muzzle velocities within relatively short barrel travel distances. The variable venting feature allows the launcher 1 to launch UAVs 32 of various mass without the need of redesigning the front body portion 3 and barrel 2 of the launcher 1 or without the need of specifying a different size or model of gas generator 10. Another unique feature of the launcher 1 is the relatively quick setup and subsequent launch method it affords, which utilizes a pre-packaged UAV 32 and pusher cup 12 within the barrel 2 that is fitted with the integral gas generator 10 as well that is easily secured onto the front body portion 3 of the launcher 1 as a single entity and then discarded after the UAV 32 is deployed. The launcher 1 may be used in a variety of applications including recreational uses as a means of delivering small novelty items or T-shirts to large audiences at concerts, sporting events, or other recreational functions. Additionally, the launcher 1 may be used in military, police, or fire department applications such as grappling hook launcher, decoy launcher, or flare delivery launcher scenarios.

In military applications, the launcher 1, because of its relatively small size, could be mounted on a light military ground vehicle, such as the U.S. Army's high mobility multi-purpose wheeled vehicle (HMMWV). This vehicle-mounted launcher 1 could also allow for remote launch from inside the HMMWV's cabin, thus protecting the crew from enemy fire during launch operations. The launcher 1 used in this configuration can achieve a muzzle exit velocity of approximately 30 to 40 m/s (98.4 ft/s to 131.2 ft/s) to facilitate transition of the UAV 32 to level powered flight at which time the UAV 32 is capable of self-flight through the use of propeller and deployable fins/wings, for example.

The gas generator 10 acts as a pressure source to propel the UAV 32 out of the disposable barrel 2 that also acts as a storage container for the UAV 32. The "onetime use" gas generator 10 attached to the launcher 1 is initiated by an electrical current supplied by a portable power source (not shown) on board the ground vehicle (not shown). Fully enclosing the UAV 32 in its own disposable barrel 2 provides added logistical and minimal setup time benefits. A temporarily connected umbilical cable (not shown) from the UAV 32 to the exterior barrel wall 9 could provide pre-launch communication, thus allowing for health status, battery charging, turn-on and initialization, target location uploading, and other functions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A launcher system for an unmanned aerial vehicle (UAV), said launcher system comprising:
   a barrel adapted to house said UAV;
   a gas generator operatively connected to said barrel and adapted to generate gas to propel said UAV out of said barrel;
   a pressure chamber operatively connected to said barrel, wherein said barrel extends out of a first end of said pressure chamber, wherein said pressure chamber is adapted to increase a pressure of said gas in said barrel, and wherein said pressure chamber comprises:
   a front body portion operatively connected to said barrel;
   an aft body portion operatively connected to said front body portion and said gas generator; and
   a vent sleeve positioned around said front body portion and adapted to provide an aperture through which said gas exits said barrel in order to control a level of gas pressure in said barrel;

a pusher cup positioned within said barrel and behind said UAV upon which said gas exerts pressure for pushing said UAV out of said barrel; and a launcher mount operatively connected to said aft body portion and adapted to position said barrel at a plurality of angles.

2. The launcher system of claim 1, wherein said gas generator utilizes approximately 24Vdc of external electrical power to initiate functioning of said gas generator.

3. The launcher system of claim 1, wherein said pressure chamber comprises a plurality of interconnected sections adapted to vent propulsion gases created by said gas generator upon launch of said UAV.

4. The launcher system of claim 3, wherein said vent sleeve comprises a gas deflector adapted to redirect the vented propulsion gases forward and away from a user standing behind said barrel.

5. The launcher system of claim 1, wherein said barrel, said UAV, said gas generator, and said pusher cup are expendable after each launch of said UAV.

6. The launcher system of claim 1, wherein said pusher cup has a higher aerodynamic drag and lower inertia than said UAV, and wherein as said UAV and said pusher cup exit said barrel, the higher aerodynamic drag and lower inertia of said pusher cup causes a rapid deceleration and separation of said pusher cup from said projectile, thereby allowing said projectile to continue a ballistic flight path prior to transition to a self-propelled flight.

7. A system for launching an unmanned projectile, said system comprising:

a barrel comprising said projectile, a pusher cup positioned behind said projectile, guide rails adapted to prevent said projectile from rotating in said barrel, and a gas generator adapted to generate gas to propel said projectile out of said barrel;

a pressure chamber operatively connected to said barrel, wherein said barrel extends out of a first end of said pressure chamber, wherein said pressure chamber is adapted to increase a pressure of said gas in said barrel, and wherein said pressure chamber comprises:

a front body portion operatively connected to said barrel;

an aft body portion operatively connected to said front body portion and said gas generator; and a vent sleeve positioned around said front body portion and adapted to provide an aperture through which said gas exits said barrel in order to control a level of gas pressure in said barrel;

a stand operatively connected to said aft body portion, wherein said stand is rotatable with respect to said barrel, wherein a triggering of said gas generator causes said pusher cup to push said projectile out of said barrel at a predetermined launch velocity in order to attain a predetermined self-propelled flight trajectory, and wherein said triggering causes said pusher cup to exit said barrel.

8. The system of claim 7, wherein said gas generator utilizes approximately 24Vdc of external electrical power to initiate functioning of said gas generator.

9. The system of claim 7, wherein said pressure chamber comprises a plurality of interconnected sections adapted to vent propulsion gases created by said gas generator upon launch of said projectile.

10. The system of claim 9, wherein said vent sleeve comprises a gas deflector adapted to redirect the vented propulsion gases forward and away from a user standing behind said barrel.

11. The system of claim 7, wherein said barrel, said projectile, said gas generator, and said pusher cup are expendable after each launch of said projectile.

12. The system of claim 7, wherein said pusher cup has a higher aerodynamic drag and lower inertia than said projectile, and wherein as said projectile and said pusher cup exit said barrel, the higher aerodynamic drag and lower inertia of said pusher cup causes a rapid deceleration and separation of said pusher cup from said projectile, thereby allowing said projectile to continue a ballistic flight path prior to transition to a self-propelled flight.

* * * * *